Sept. 27, 1955  M. C. KUNZ ET AL  2,719,267
MAGNET STRUCTURE FOR ELECTRICAL INSTRUMENTS
Filed April 16, 1951  2 Sheets-Sheet 2
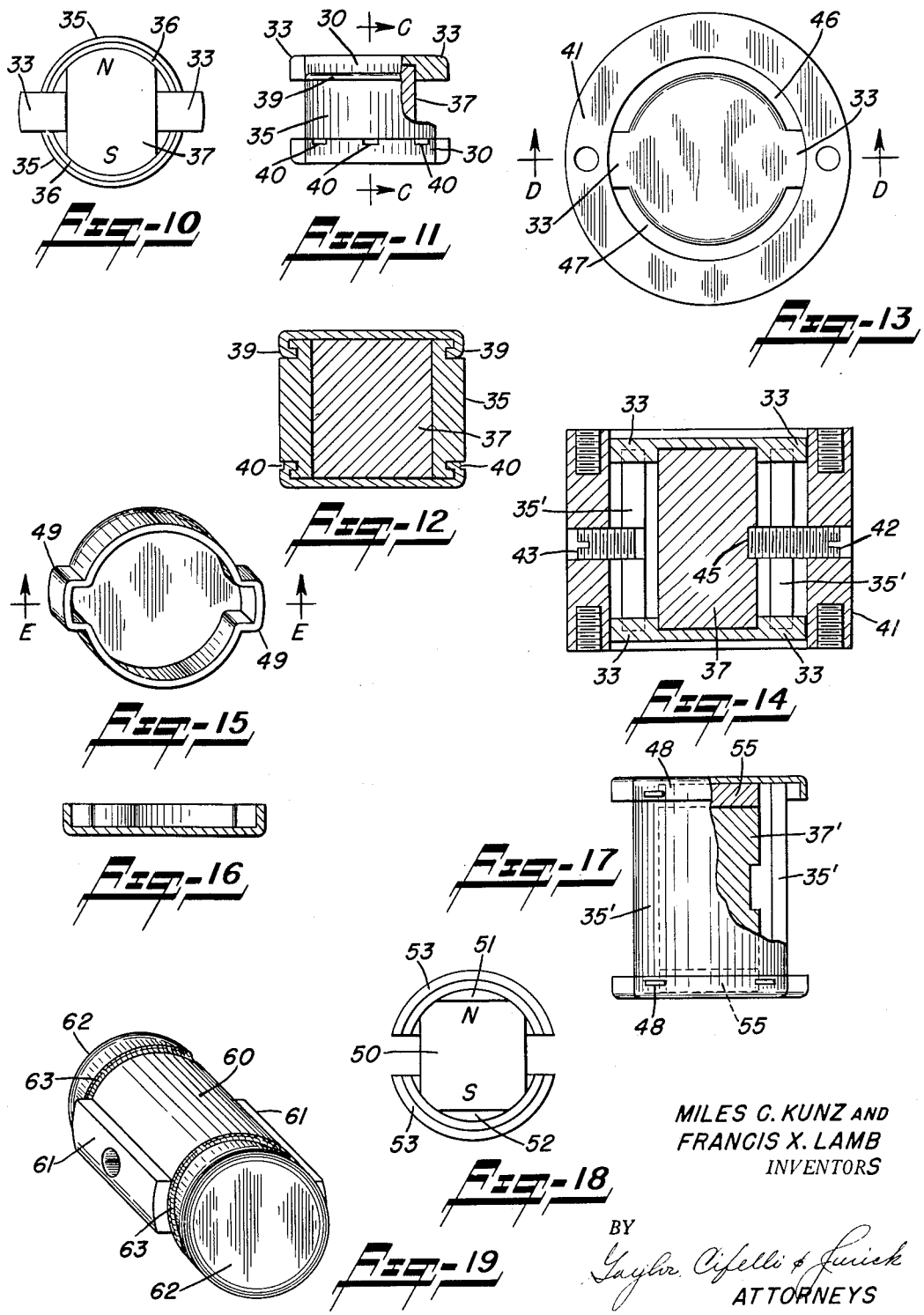
MILES C. KUNZ AND
FRANCIS X. LAMB
INVENTORS
BY
ATTORNEYS United States Patent Office 2,719,267
Patented Sept. 27, 1955

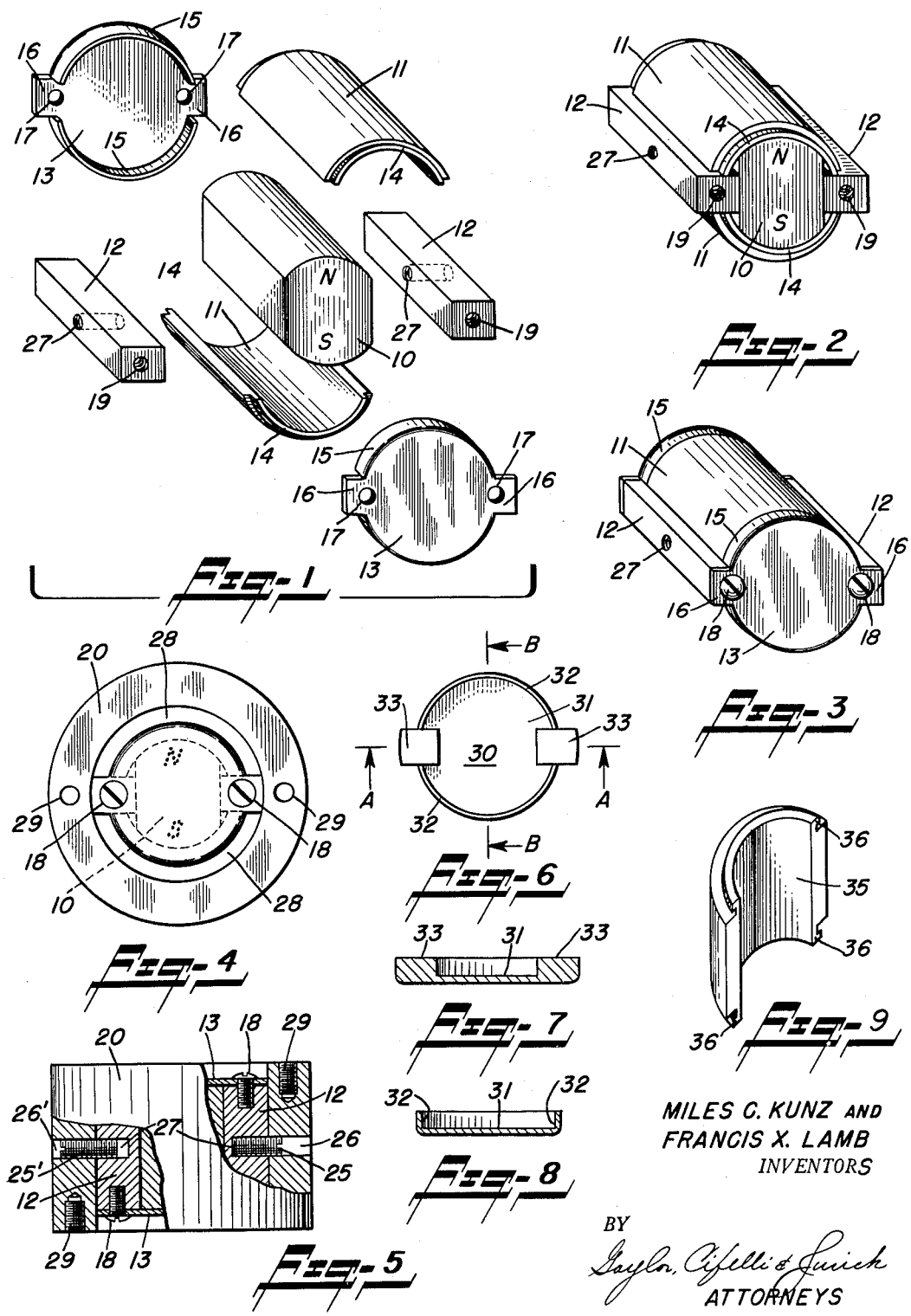

2,719,267

MAGNET STRUCTURE FOR ELECTRICAL INSTRUMENTS

Miles C. Kunz, Union, and Francis X. Lamb, East Orange, N. J., assignors to Weston Electrical Instrument Corporation, Newark, N. J., a corporation of New Jersey Application April 16, 1951, Serial No. 221,174

13 Claims. (Cl. 324—151)

This invention relates to an electrical instrument of the type having a permanent magnet core and more particularly to the mechanical construction and assembly of the permanent magnet core elements.

The permanent magnet core type of electrical instruments and relays have the advantages, as compared with the conventional C-shaped magnet and soft-iron core types, of smaller size and lighter weight for a given instrument sensitivity. Such instruments are also self-shielded against external magnetic fields since the soft-iron yoke, or return path for the magnetic flux, extends around the permanent magnet core and the movable coil. One limitation of the permanent magnet core type instrument is that the substantially cylindrical magnet does not provide a uniform magnetic flux field in the gap between the magnet and the yoke. While this is of no practical significance in relays and in indicating instruments having a relatively small angular coil rotation, it does pose a problem in high accuracy indicating instruments wherein the coil rotation is approximately 90 degrees and it is desired to provide a scale having uniformly-spaced calibration points throughout such coil-deflection angle. Shaping the permanent magnet core affords some degree of relief, in this respect, but it has been found that the magnet materials best suited for such applications are not uniform throughout the entire magnet with the result that expanded and contracted portions appear on the calibrated scale of the instrument. Generally speaking, it is, therefore, necessary to employ soft-iron pole pieces in conjunction with the permanent magnet core in order to obtain a uniform distribution of the magnetic flux in the operating range of the air gap. Prior such construction of magnet core and pole pieces have been open to the objections that they did not lend themselves to mass production methods and/or did not afford a sufficiently large angular deflection of the movable coil.

An object of this invention is the provision of an instrument magnet system in which the permanent magnet core elements can be manufactured and assembled economically and with substantial uniformity by mass production methods.

An object of this invention is the provision of permanent magnet core structures which comprise a transversely magnetized permanent magnet, arcuate pole pieces of soft-iron, mounting lugs adapted for proper location of the magnet relative to a soft-iron yoke, and end caps serving to secure together the magnet, pole pieces and mounting lugs in proper operative relation.

An object of this invention is the provision of a permanent magnet core structure comprising a transversely magnetized permanent magnet, a pair of soft-iron pole pieces disposed on opposite sides of the magnet and having surfaces mating with the polar surfaces of the magnet, and end cap members that serve to secure the pole pieces firmly to the magnet, which end cap members include lugs that serve to locate the system within a substantially cylindrical soft-iron yoke.

An object of this invention is the provision of permanent magnet core elements including a transversely magnetized permanent magnet, a pair of soft-iron pole pieces, and end caps associated with the magnet and pole pieces in such manner that these members are firmly secured together without the use of screws, solder or other separate fastening means.

These and other objects and advantages will be apparent from the following description when taken with the accompanying drawings. The drawings are for purposes of illustration and are not to be construed as defining the scope or limits of the invention, reference being had for the latter purpose to the appended claims.

In the drawings wherein like reference characters denote like parts in the several views:

Figure 1 is an exploded view, in isometric, showing the component parts that are assembled together to form a permanent magnet core structure in accordance with one embodiment of this invention;

Figure 2 is an isometric view showing the permanent magnet core, soft-iron pole pieces and spacer bars assembled together in proper, relative position;

Figure 3 is similar to Figure 2 and showing the entire assembly of parts secured together by the end caps;

Figure 4 is a top plan view showing the permanent magnet core system of Figure 3 disposed within a soft-iron yoke to form a magnetic flux path for the movable coil of an electrical indicating instrument;

Figure 5 is a side elevation of the Figure 4 device with parts drawn in section;

Figure 6 is a plan view of a die-cast end cap that eliminates the need for the separate spacer bars;

Figures 7 and 8 are sectional views taken along the lines A—A and B—B, respectively, of Figure 6;

Figure 9 is an isometric view of one of the pole pieces designed for use with the end caps of the type shown in Figure 6;

Figure 10 is a top view showing a permanent magnet core and two pole pieces disposed on the end cap shown in Figure 6;

Figure 11 is a side elevation of a structure such as is shown in Figure 10 and including two end caps of the Figure 6 construction;

Figure 12 is a cross-sectional view taken along the line C—C of Figure 11 and drawn to an enlarged scale to show the mechanical bond between the end caps and the soft-iron pole pieces;

Figure 13 is a top plan view showing the Figure 11 permanent magnet core system disposed within a soft-iron yoke;

Figure 14 is a cross-sectional view taken along the line D—D of Figure 13;

Figure 15 is an isometric view showing another construction of the end cap that can be punched and shaped in a single operation from flat stock;

Figure 16 is a cross-sectional view taken along the line E—E of Figure 15;

Figure 17 is a side elevation, with parts broken away, of a magnet structure including two end caps of the Figure 15 construction;

Figure 18 is an end view of a permanent magnet and two pole pieces but in this case the magnet is provided with additional flat surfaces at the magnetic axis to provide a more uniform magnetic flux distribution in the air gap when the system is disposed within a soft-iron yoke; and Figure 19 is an isometric view of another embodiment of the invention.

Reference is now made to Figure 1, wherein there is shown all the components that go to make a magnet core structure in accordance with one embodiment of this invention. These components comprise a transversely magnetized permanent magnet 10, made of suitable alloy such as Alnico V, a pair of arcuate, soft-iron pole pieces 11, a pair of non-magnetic spacer bars 12 and a pair of non-magnetic end caps 13. The permanent magnet is, essentially, a cylinder with oppositely located cylindrical segments cut away along parallel planes symmetrically positioned with respect to the axis of the cylinder. Such magnet is transversely magnetized in its longer direction whereby the arcuate surfaces constitute the polar surfaces of the magnet. The soft-iron pole pieces 11 are curved to conform to the polar surfaces of the permanent magnet so that the pole pieces will contact the entire polar surface of the magnet as shown in the partially completed assembly of Figure 2. It is pointed out that each end of each pole piece is cut back along the outer surface resulting in the arcuate ridges 14. The depth and width of the arcuate cut-back section at the end of each pole piece corresponds to the dimensions of the side walls 15 of the end caps 13, whereby the end caps and the pole pieces form a smooth outer surface in the assembled unit, as shown in Figure 3.

It will be noted that the end caps have a relatively thin base terminating in the opposed lugs 16, each such lug including a hole 17, and that the side walls 15 of each cap are discontinuous. More specifically, the side walls terminate at the lugs thereby providing diametrically-opposed passageways between each lug and the base of the cap. The width of such passageways is just sufficient to accommodate the ends of the spacer bars 12. These spacer bars have a thickness such that when they are assembled together with the magnet and the pole pieces, the two pole pieces will form a perfect circle, as shown in Figure 2. As clearly shown in Figure 2, the spacer bars 12 abut against the flat sides of the magnet 10 and the sides of the pole pieces 11 abut against sides of the spacer bars while, at the same time, the central portion of each of the pole pieces engages the arcuate, polar surface of the magnet. Further, the ends of the magnet, spacer bars and the ridges 14 of the pole pieces all lie in a common plane. Consequently, the end caps 13 will fit nicely over each end of the Figure 2 assembly to retain all parts in proper relative position. The screws 18, passing through the holes in the lugs of the end caps and into the threaded holes 19 in the spacer bars, serve to secure the end caps in place. There is thus provided a rigid, mechanically strong, magnet core structure comprising individual elements that can be made by mass production methods and which are relatively simple to assemble. The end caps, preferably, are made of non-magnetic material such as brass, zinc, nickel-silver, etc., and may be die cast or stamped from flat stock. Also, the spacer bars preferably are made of non-magnetic material. In such construction, the magnetic flux provided by the permanent magnet is distributed along the arcuate length of the opposed, soft-iron pole pieces as the spacer bars and end caps have no effect upon the magnetic flux field.

Reference is now made to Figure 4 showing the permanent magnet core structure of Figure 3 disposed within a cylindrical, soft-iron yoke 20 having an inside bore corresponding to the maximum diameter of the core assembly. The magnet core assembly of Figure 3 can be chucked in a lathe and the outer sides of the spacer bars 12 and the lugs 16 of the end caps turned on a diameter corresponding precisely to the inside diameter of the soft-iron yoke. Alternatively, these parts may be provided with such rounded surfaces in the first instance, it being apparent the end caps may be die cast or punched to a desired shape and that the spacer bars may be molded or extruded. In any event, when the outer surfaces of the spacer bars and the end caps are curved on a radius corresponding to that of the bore of the yoke, the assembled magnet core structure will fit nicely within the yoke and can be secured in fixed position relative thereto by a non-magnetic screw 25 passing through a threaded hole 26 in the yoke and into a cooperating hole 27 in the adjacent spacer bar, as shown in Figure 5. The screw 25' passing through the diametrically opposed, threaded hole 26' in the yoke may be made of a magnetic material, such as steel, to serve as a magnetic shunt, that is, the spacing between such screw and the magnet 10 will, to some extent, alter the flux density in the operative portion of the flux gaps 28 between the pole pieces 11 and the yoke, see Figure 4. Those skilled in this art will understand the movable coil of the instrument operates in the flux gaps 28, such movable coil being pivotally mounted between bridge members supported on opposite sides of the yoke by posts inserted in the holes 29 in the yoke. Magnetic flux produced by the permanent magnet 10 is distributed substantially uniformly throughout such flux gaps by the arcuate, soft-iron pole pieces that are in face contact with the polar surfaces of the magnet. The described construction of the permanent magnet core structure is satisfactory for use in D.-C. instruments and relays which do not require absolutely uniform coil-deflection characteristics. Where deflection characteristics of a more precise uniformity are required certain minor changes in the core magnet structure may be made as will be described with specific reference to Figures 17 and 18.

As pointed out with reference to Figure 2, the spacer bars 12 serve as a means for spacing the soft-iron pole pieces and for securing the two end caps in place. A modification of the end cap shape makes it possible to eliminate the spacer bars and obviates the need for fastening the end caps by means of screws. Figures 6 to 8 illustrate the modified end cap construction. In this case the cap 30 is die cast as a single unit and includes the base 31, the relatively-thin side walls 32 and the solid, diametrically-opposed lugs 33 that protrude beyond the outer surface of the side walls and into the interior of the cap. The lugs are shown more clearly in Figure 7 which is a cross-sectional view taken along the line A—A of Figure 6. Figure 8 is a cross-sectional view taken along the line B—B of Figure 6.

Figure 9 illustrates one of the two, identical, soft-iron pole pieces 35 for use in a magnet core system employing two end caps of the type shown in Figures 6–8. The ends of the pole piece are cut back to provide the arcuate ridges 36, it being important to note that such ridges are undercut radially at the base, for purposes to be described in detail with specific reference to Figures 11 and 12.

Figure 10 is a top plan view showing the transversely magnetized permanent magnet 37 and the two arcuate pole pieces 35 placed into an end cap of the type shown in Figure 6. It will be noted that the flat sides of the magnet abut against the inner, flat ends of the lugs 33 of the end cap, that the pole pieces contact the opposed polar surfaces of the magnet, and that the sides of the pole pieces abut against the sides of the lugs 33. Inasmuch as the side walls 32 of the end cap (see Figure 6) have a thickness and depth corresponding to the cut back portion of the pole piece ends, the end caps will serve to hold such pole pieces in position with the outer surfaces of the end cap walls and the pole pieces forming a smooth, substantially continuous surface. In the described arrangement, the parts form a more or less interlocked assembly with each part properly disposed relative to the other parts. The end caps are secured to the pole pieces by forcing a portion of the end cap side walls into the undercut portion of the pole pieces. This can be done by pressure applied to the edge of the end cap wall by means of a suitable tool to deform the cap wall.

Figure 11 is a side elevation of a complete magnet core structure with parts broken away to show the permanent magnet 37, and Figure 12 is a central section taken along the line C—C of Figure 11 and drawn to an enlarged scale. As shown in Figure 11, the side wall of the upper end cap includes a pressure-formed indentation 39 that runs substantially the full arcuate length of the associated pole piece 35. Alternatively, a plurality of individual indentations 40 may be formed as shown with respect to the lower end cap. In either case, the indentations are formed by a flow of the material into the undercut portion of the pole piece ridge and such displaced material locks the end caps to the pole pieces as clearly shown in Figure 12. Attention is directed to the solid lugs 33 of the end caps, which lugs protrude beyond the pole pieces by an amount corresponding to the width of the magnetic flux gap to be established in a particular instrument. As shown in Figures 6 and 10 the outer surfaces of these lugs are rounded to conform to the inside bore of the associated soft-iron yoke.

The long arcuate indentation 39, on either side of the upper end cap (Figure 11) and the shorter, individual indentations 40 in the lower end cap are equivalents. Actually, one or the other of such arrangements will be used on both end caps of a magnet core system. As a matter of practice, the full indents are used when the end caps are die cast of zinc. Such material is relatively soft and the long indentations are simple to impress, and, of equal importance, the long indentation provides a greater mass of material in the undercut portion of the pole piece which is desirable. However, when the end caps are made of a relatively hard material, such as brass or nickel-silver, a plurality of relatively short indentations represent better production practice and, since the material is hard, even small quantities of the end cap material deformed into the undercut portions of the pole pieces serve amply to secure the end caps thereto.

Reference is now made to Figures 13 and 14 showing the core magnet structure of the type just described, disposed within a soft-iron yoke 41, with the opposed lugs 33 contacting the inner wall of the yoke. The permanent magnet core structure is secured in proper fixed position relative to the yoke by a non-magnetic screw 42 passing through a threaded hole in the side of the yoke. This screw may be of relatively large diameter and since it engages the opposed, flat surface of the permanent magnet 37 the yoke and core system will remain fixed relative to each other even though the assembly be subjected to rather heavy mechanical shocks. To prevent possible axial displacement of the core system within the yoke, under conditions of severe mechanical shock, the flat surface of the permanent magnet may be provided with a transverse recess 45 of shallow depth and having a width equal to or just slightly less than, the diameter of the screw 42, whereby the end of such screw will bite into the magnet material. The other screw 43 may be made of a magnetic material such as steel, to serve as a magnetic shunt, as described with reference to Figure 5.

It may here be pointed out that the permanent magnet core structure just described comprises individual parts that can be made by mass production methods and techniques and such parts are secured together without the use of screws, solders, or other separate fastening means, to provide a rugged yet functionally accurate device.

Figure 15 is an isometric view of another construction of the end cap, Figure 16 being a sectional view taken along the line E—E of Figure 15. This end cap is designed for punch press production in a single operation and is particularly adapted for use with larger magnet cores such as, for example, those designed for instruments having a 1 inch movable coil. It will be noted the lugs 49, extending from opposite sides of the cap, include a side wall that is continuous around the entire periphery of the cap, as distinguished from the solid lugs 33 of the Figure 6 construction. As described hereinabove with reference to Figures 6 and 10, the solid lugs serve to locate the permanent magnet and to space the pole pieces, which parts lie within the confines of the end caps. Since the lugs 49, of the Figure 15 end cap construction, do not extend into the end cap, some means must be provided to locate properly the magnet and pole pieces during the assembly of the magnet core system. This can be done quite simply by using two spacer bars, similar to the bars 12 employed with the Figure 1 construction. These are inserted against the flat surfaces of the permanent magnet and endwise between the aligned lugs of the two end caps. The pole pieces are undercut, as shown in Figure 9, and the end caps secured thereto by forming pressure indents in the cap walls, as shown and described with reference to Figures 11 and 12. When the caps are thus secured in place the spacer bars are withdrawn. While it is, of course, possible to form the cap lugs 49 on an arc corresponding to the bore diameter of the yoke to be used with the particular magnet core system, a more precise fit is obtained by turning down the assembled core structure, as already explained.

As stated hereinabove, the soft-iron pole pieces that are in smooth contact with the polar surfaces of the permanent magnet distribute the magnetic flux fairly uniformly throughout the flux gap formed between such pole pieces and the spaced yoke. The ridges at the ends of the soft-iron pole pieces are of reduced cross-sectional area and in certain applications these relatively, thin-walled portions of the pole pieces become saturated resulting in a non-uniform flux distribution in the instrument air gaps. This effect may be overcome by making the axial length of the magnet somewhat shorter than that of the pole pieces as shown in Figure 17. Here, the ends of the pole pieces 35' are in contact with the inner surface of the end caps 48 (of the type shown in Figure 15) and the magnet 37' is spaced from such surface by the flat spacers 55 made of a non-magnetic material such as brass. Alternatively, or additionally, the permanent magnet can be formed as shown in Figure 18. Here the magnet 50 has additional cylindrical segments cut away at the magnetic axis and normal thereto, resulting in the air spaces 51, 52 between the magnet and the soft-iron pole pieces 35'. As is well known, such air spaces increase the reluctance of the magnetic path and results in a reduction of the magnetic flux at these points. By so removing a proper amount of the magnet material the magnetic flux emanating outwardly from the pole pieces will be, for all practical purposes, uniform over the surface of the pole pieces.

The three different end cap constructions illustrated in Figures 1, 6 and 15 each include integral lugs extending radially outward of the cap. In the Figure 1 construction, which employs the spacer bars 12, the lugs serve as a means for securing the two end caps to the spacer bars. In the Figures 6 and 15 constructions, in which the end caps are secured to the pole pieces, the externally extending lugs serve to position the magnet core structure within the soft-iron yoke and to establish the radial length of the two flux gaps. While we prefer to employ end caps that include such integral lugs, the broad aspects of the invention are not limited thereto. The cap lugs may be omitted in constructions employing spacer bars, as shown in Figure 19. In his case the ends of the pole pieces 60 (only one such pole piece being visible in the isometric view) extend beyond the spacer bars 61. Such pole piece ends are provided with undercut ridges into which the side walls of the end caps 62 are deformed by the pressure formed indentations 63, as described hereinabove.

Having now described our invention in accordance with the patent statutes those skilled in this art will be able to make various changes and modifications in our magnetic field structure to meet specific requirements. Such changes and modifications may be made without departing from the spirit and scope of the invention as set forth in the following claims.

We claim:

1. A permanent magnet structure for an electrical instrument said structure comprising a transversely-magnetized permanent magnet having mono-planar sides substantially parallel to the magnetic axis and multi-planar polar surfaces; a pair of arcuate soft-iron pole pieces in the form of cylindrical sections, said pole pieces being in smooth contact with at least a portion of the polar surfaces of the magnet and adjacent sides of the pole pieces being spaced from each other; a pair of cup-shaped, non-magnetic end caps disposed over the ends of the magnet and of the pole pieces, said end caps including integral, diametrically-opposed lugs extending outwardly between the pole pieces and beyond the outer surfaces thereof and depending arcuate side walls overlying the ends of the pole pieces; and fastening means retaining the end caps in fixed position relative to the pole pieces.

2. The invention as recited in claim 1 including spacer bars disposed between the adjacent side edges of the pole pieces, said spacer bars having ends abutting the lugs of the end caps.

3. The invention as recited in claim 1, wherein the ends of the pole pieces include circumferential recesses and the side walls of the end caps fit into such recesses with the outer surface of the arcuate walls of the end caps being flush with the outer surfaces of the pole pieces.

4. A permanent magnet structure for an electrical instrument said structure comprising a transversely-magnetized permanent magnet having mono-planar sides substantially parallel to the magnetic axis and multi-planar polar surfaces; a pair of arcuate, soft-iron pole pieces in the form of cylindrical sections and in smooth contact with at least a portion of the polar surfaces of the magnet, said pole pieces having ends that are of reduced thickness and undercut radially to form arcuate ridges; a pair of cup-shaped, non-magnetic end caps disposed over the ends of the magnet and of the pole pieces, said end caps including integral, diametrically-opposed lugs extending outwardly between the pole pieces and beyond the outer surfaces thereof and said end caps having a depending side wall overlying the ridges of the pole pieces with at least a portion of such side wall offset into the undercut portion of the ridges.

5. The invention as recited in claim 4 wherein the diametrically-opposed lugs also extend inwardly of the end caps and the sides of the pole pieces abut against the internal portions of the lugs.

6. The invention as recited in claim 5 wherein the said mono-planar sides of the magnet abut against the inner edges of the internal portions of the lugs.

7. The invention as recited in claim 4 including non-magnetic spacer discs disposed between each end of the magnet and the associated end cap.

8. The invention as recited in claim 4 wherein the polar surfaces of the magnet include mono-planar portions substantially normal to the magnetic axis.

9. The invention as recited in claim 4 wherein the said lugs also include depending said walls; and including spacer bars disposed between the adjacent sides of the pole pieces, said spacer bars having ends disposed between the depending side walls of the lugs.

10. A magnetic field structure for an electrical instrument said structure comprising a substantially cylindrical yoke of magnetic material having an axial bore extending therethrough; a transversely-magnetized permanent magnet core disposed within the bore of the yoke, said core having mono-planar sides substantially parallel to the magnetic axis and multi-planar polar surfaces; a pair of soft-iron pole pieces in the form of cylindrical sections and in smooth contact with at least a portion of the polar surfaces of the core and adjacent sides of the pole pieces being spaced apart from each other; a pair of cup-shaped, non-magnetic end caps disposed over the ends of the core and of the pole pieces, said end caps including integral, diametrically-opposed lugs extending outwardly between the pole pieces and beyond the outer surfaces thereof, and the ends of said lugs being in smooth contact with the wall defining the bore in the yoke; fastening means securing the end caps in fixed position relative to the core; and means securing the yoke and core against relative rotation.

11. A magnetic field structure for an electrical instrument said structure comprising a substantially cylindrical yoke of magnetic material having an axial bore extending therethrough; a transversely-magnetized permanent magnet core having mono-planar sides substantially parallel to the magnetic axis and multi-planar polar surfaces; a pair of soft-iron pole pieces in the form of cylindrical sections and in smooth contact with at least a portion of the polar surfaces of the core, said pole pieces having ends that are of reduced thickness and undercut radially to form arcuate ridges; a pair of cup-shaped, non-magnetic end caps disposed over the ends of the core and of the pole pieces and including integral, diametrically-opposed lugs extending outwardly between the pole pieces and beyond the outer surfaces thereof, said end caps having a depending side wall overlying the ridges of the pole pieces with at least a portion of such side wall offset into the undercut portion of the ridges and the ends of said lugs being in smooth contact with the wall defining the bore in the yoke; and means securing the yoke and core against relative rotation.

12. The invention as recited in claim 11 wherein the said lugs also extend inwardly of the end caps; the sides of the pole pieces abut against the sides of the internal portion of the lugs; and the said mono-planar surfaces of the core abut against the inner edges of the internal portion of the lugs.

13. The invention as recited in claim 12 wherein the means securing the yoke and magnet against relative rotation comprises a screw passing through a radial, threaded hole in the yoke and into direct contact with one of the mono-planar surfaces of the core.

References Cited in the file of this patent

UNITED STATES PATENTS

| | | |
|---|---|---|
| 1,927,346 | Lawrence | Sept. 19, 1933 |
| 2,408,060 | Grace | Sept. 24, 1946 |
| 2,607,812 | Lederer | Aug. 19, 1952 |

OTHER REFERENCES

Weston Engineering Notes, February 1949, vol. 4, No. 1. Copy in 171–95–12C.